(12) United States Patent
Kanai

(10) Patent No.: US 7,914,447 B2
(45) Date of Patent: Mar. 29, 2011

(54) CONFOCAL SCANNING ENDOSCOPE SYSTEM AND IMAGE DISPLAY AREA ADJUSTMENT METHOD THEREOF

(75) Inventor: Moriyasu Kanai, Saitama (JP)

(73) Assignee: Hoya Corporation, Tokyo (JP)

( * ) Notice: Subject to any disclaimer, the term of this patent is extended or adjusted under 35 U.S.C. 154(b) by 965 days.

(21) Appl. No.: 11/463,417

(22) Filed: Aug. 9, 2006

(65) Prior Publication Data
US 2007/0035797 A1    Feb. 15, 2007

(30) Foreign Application Priority Data
Aug. 10, 2005   (JP) ................ P2005-231433

(51) Int. Cl.
*A61B 1/06* (2006.01)
(52) U.S. Cl. ........ 600/160; 600/101; 600/178; 348/68; 362/574
(58) Field of Classification Search ........... 600/101, 600/109, 118, 160, 167, 168, 174–182, 476, 600/478, 139; 348/65, 68, 69; 362/572, 362/574; 385/117, 119; 359/212.1, 212.2
See application file for complete search history.

(56) References Cited

U.S. PATENT DOCUMENTS

| | | | | |
|---|---|---|---|---|
| 5,272,538 A * | 12/1993 | Homma et al. | ............. | 348/362 |
| 6,317,258 B1 | 11/2001 | Watanabe | | |
| 6,437,910 B1 | 8/2002 | Watanabe | | |
| 7,061,673 B2 | 6/2006 | Mizuno | | |
| 7,136,098 B1 * | 11/2006 | Burnett et al. | ............. | 348/230.1 |
| 2002/0093563 A1 * | 7/2002 | Cline et al. | ........... | 348/65 |
| 2004/0092792 A1 * | 5/2004 | Kobayashi | ........... | 600/101 |
| 2004/0122289 A1 | 6/2004 | Mizuno | | |
| 2004/0147810 A1 | 7/2004 | Mizuno | | |
| 2004/0173738 A1 | 9/2004 | Mizuno | | |
| 2004/0242966 A1 * | 12/2004 | Barry et al. | ........... | 600/146 |
| 2005/0052753 A1 | 3/2005 | Kanai | | |
| 2006/0167344 A1 | 7/2006 | Mizuno | | |

FOREIGN PATENT DOCUMENTS

| | | |
|---|---|---|
| JP | 2000-275528 | 10/2000 |
| JP | 2004-138947 | 5/2004 |

OTHER PUBLICATIONS

English language Abstract of JP 2000-275528.
English language Abstract of JP 2004-138947.

* cited by examiner

*Primary Examiner* — John P Leubecker
*Assistant Examiner* — Samuel Candler
(74) *Attorney, Agent, or Firm* — Greenblum & Bernstein, P.L.C.

(57) ABSTRACT

There is provided a confocal scanning endoscope system, which is provided with a light source that emits light, a scanning unit that deflects the light emitted by the light source so that the light scans on a subject in two dimensions, an objective optical system that directs the light deflected by the scanning unit to the subject, an extraction unit that extracts only part of the light returning from a convergence point at which the light is converged by the objective optical system on an object side, an image formation unit configured to form an image based on the part of the light extracted by the extraction unit, and a display area adjustment unit configured to measure Encircled Energy of the part of the light extracted by the extraction unit and to adjust a display area of the image based on the measured Encircled Energy.

20 Claims, 6 Drawing Sheets

CONFOCAL SCANNING ENDOSCOPE SYSTEM AND IMAGE DISPLAY AREA ADJUSTMENT METHOD THEREOF

BACKGROUND OF THE INVENTION

The present invention relates to a confocal scanning endoscope system having a confocal observation function.

Confocal scanning microscope systems capable of providing highly magnified high resolution images have been used. The confocal scanning microscope system is configured to emit a laser beam scanning on a sample in two dimensions. An operator of the confocal scanning microscope system observes the sample through a highly magnified high resolution observation image formed by the confocal scanning microscope system by illuminating the sample with the laser beam and receiving the laser beam from the sample through a pinhole positioned at a point conjugate with the sample. Examples of such a confocal scanning microscope system are disclosed in Japanese Patent Provisional Publications Nos. 2000-275528A and 2004-138947A.

The above mentioned confocal microscope system requires an operator to remove part of tissue in a body cavity of a subject using an endoscope so that the removed part of the tissue can be observed using the confocal scanning microscope system. That is, the confocal observation requires the operator to conduct troublesome work in which removal of tissue and the observation of the tissue have to be conducted using separate apparatuses.

For this reason, an endoscope system having the above mentioned function of the confocal scanning microscope system is desired. Such an endoscope system (hereafter, referred to as a confocal scanning endoscope system) is able to reduce a load on the operator during observations. Because the confocal scanning endoscope system is configured to move light in two dimensions on tissue, there is a case where the light passes through a peripheral region of a confocal optical system provided in the confocal scanning endoscope system. Because the peripheral region of the confocal optical system causes aberrations in a larger amount than a central region of the confocal optical system, light-gathering power of the confocal optical system decreases in the peripheral region. Therefore, resolution and brightness of a part of an image formed in the confocal scanning endoscope optical system by the light passing through the peripheral region of the confocal optical system decrease, and thereby a peripheral part of an observation image may become blurred.

Using the confocal scanning endoscope system, the operator attempts to find abnormality of tissue, for example, based on change of a shape of a cell while observing the observation image displayed on a monitor of the confocal scanning endoscope system. If a blurred part appears on the observation image due to the above mentioned factors specific to the confocal scanning endoscope system, the diagnosis by the operator may be adversely affected.

As in the case of a normal endoscope system, the confocal scanning endoscope system is required to reduce the diameter of an insertion tube which is inserted into a body cavity of a subject by downsizing the confocal optical system so that a load on the subject during the diagnosis can be reduced.

However, downsizing an optical system leads to increasing the amount of off-axial aberration. In other words, downsizing the confocal optical system for decreasing the diameter of the insertion tube, the blurred part in the observation image may become larger. Further, if the confocal optical system has positional errors, such as decentering, the blurred part appears on the observation image in a shape asymmetric about an optical axis of the confocal optical system. Such deterioration of the observation image may also adversely affect the diagnosis by the operator.

SUMMARY OF THE INVENTION

The present invention is advantageous in that it provides a confocal scanning endoscope system capable of providing an observation image from which a blurred part caused by factors specific to the confocal scanning endoscope system is removed.

According to an aspect of the invention, there is provided a confocal scanning endoscope system, which is provided with a light source that emits light, a scanning unit that deflects the light emitted by the light source so that the light scans on a subject in two dimensions, an objective optical system that directs the light deflected by the scanning unit to the subject, an extraction unit that extracts only part of the light returning from a convergence point at which the light is converged by the objective optical system on an object side, an image formation unit configured to form an image based on the part of the light extracted by the extraction unit, and a display area adjustment unit configured to measure Encircled Energy of the part of the light extracted by the extraction unit and to adjust a display area of the image based on the measured Encircled Energy.

By adjusting the display area based on the measured Encircled Energy, it is possible to form the image based on the light passing through a part of the objective optical system having high resolution. In other words, it is possible to display a high quality image for observations not having a blurred region caused by factors specific to the confocal scanning endoscope system. Such a configuration enables an operator to conduct endoscopic observations.

In at least one aspect, the display area adjustment unit adjusts the display area such that the Encircled Energy is larger than or equal to a predetermined level in the display area in accordance with a relationship between the Encircled Energy and lateral resolution of the objective optical system.

With this configuration, it is possible to form the image based on the light passing through a part of the objective optical system having a resolution higher than or equal to a predetermined level.

In at least one aspect, the display area adjustment unit adjusts the display area such that the Encircled Energy in the display area is larger than or equal to −5 dB with respect to the Encircled Energy defined for the part of the light proceeding along an optical axis of the objective optical system.

In at least one aspect, the display area adjustment unit adjusts the display area such that the Encircled Energy in the display area is larger than or equal to −3 dB with respect to the Encircled Energy defined for the part of the light proceeding along the optical axis of the objective optical system. In this case, lateral resolution of the objective optical system defined in the display area with respect to lateral resolution of the objective optical system at a center of the image is 0.7.

In at least one aspect, the Encircled Energy is measured by the display adjustment unit in a condition where the subject illuminated with the light is a sample formed of homogeneous material.

In at least one aspect, the display area adjustment unit generates information concerning the adjusted display area and provides the information for the image formation unit. In this case, the image formation unit forms the image further based on the information concerning the adjusted display area.

In at least one aspect, the display area adjustment unit generates information concerning the adjusted display area and provides the information for the scanning unit. In this case, the scanning unit deflects the light based on the information concerning the adjusted display area so that the light is deflected in a range corresponding to the adjusted display area.

In at least one aspect, the confocal scanning endoscope system further includes an endoscope comprising an flexible insertion tube in which the light source, the scanning unit, the objective optical system and the extraction unit are accommodated, a processor comprising the image formation unit, and a display unit on which the image formed by the image formation unit is displayed. In this case, the endoscope and the display unit are connected to the processor, and the display area adjustment unit is detachably attached to the processor.

In at least one aspect, the endoscope includes an optical fiber provided in the flexible insertion tube. In this case, a facet of the optical fiber at a tip portion of the flexible insertion tube serves as the light source.

In at least one aspect, the scanning unit deflects the light by moving the facet of the optical fiber in a plane with which an optical axis of the objective optical system perpendicularly intersects.

In at least one aspect, the facet of the optical fiber is located at a position conjugate with the subject with respect to the objective optical system. In this case, the facet serves as the extraction unit.

In at least one aspect, the Encircled Energy is proportional to a square of lateral resolution of the objective optical system.

According to another aspect of the invention, there is provided a confocal scanning endoscope system, which is provided with a light source that emits light, a scanning unit that deflects the light emitted by the light source so that the light scans on a subject in two dimensions, an objective optical system that directs the light deflected by the scanning unit to the subject, an extraction unit that extracts only part of the light returning from a convergence point at which the light is converged by the objective optical system on an object side, and an image formation unit configured to form an image based on the part of the light extracted by the extraction unit. Encircled Energy of the part of the light extracted by the extraction unit is larger than or equal to a predetermined level in an entire region of the image formed by the image formation unit.

With this configuration, it is possible to form the image based on the light passing through a part of the objective optical system having high resolution. In other words, it is possible to display a high quality image for observations not having a blurred region caused by factors specific to the confocal scanning endoscope system. Such a configuration enables an operator to conduct endoscopic observations.

In at least one aspect, the Encircled Energy in the entire region of the image is larger than or equal to −5 dB with respect to the Encircled Energy defined for the part of the light proceeding along an optical axis of the objective optical system.

In at least one aspect, the confocal scanning endoscope system further comprises a display unit on which the image formed by the image formation unit is displayed.

According to another aspect of the invention, there is provided an adjustment method for an image formed by a confocal scanning endoscope system comprising a scanning unit that deflects light emitted by a light source so that the light scans on a subject in two dimensions, an extraction unit that extracts only part of the light returning from a convergence point at which the light is converged by an objective optical system on an object side, and an image formation unit configured to form an image based on the part of the light extracted by the extraction unit. The method includes measuring Encircled Energy of the part of the light extracted by the extraction unit, and adjusting a display area of the image based on the measured Encircled Energy.

With this configuration, it is possible to form the image based on the light passing through a part of the objective optical system having high resolution. In other words, it is possible to display a high quality image for observations not having a blurred region caused by factors specific to the confocal scanning endoscope system. Such a configuration enables an operator to conduct endoscopic observations.

In at least one aspect, the measuring of Encircled Energy is conducted in a condition where the subject illuminated with the light is a sample formed of homogeneous material.

In at least one aspect, the display area of the image is adjusted by masking a part of the image formed by the image formation unit.

In at least one aspect, the display area of the image is adjusted by causing the scanning unit to adjust a scanning range of the light.

BRIEF DESCRIPTION OF THE
ACCOMPANYING DRAWINGS

DETAILED DESCRIPTION OF THE
EMBODIMENTS

Hereinafter, an embodiment according to the invention is described with reference to the accompanying drawings.

Figure 1:
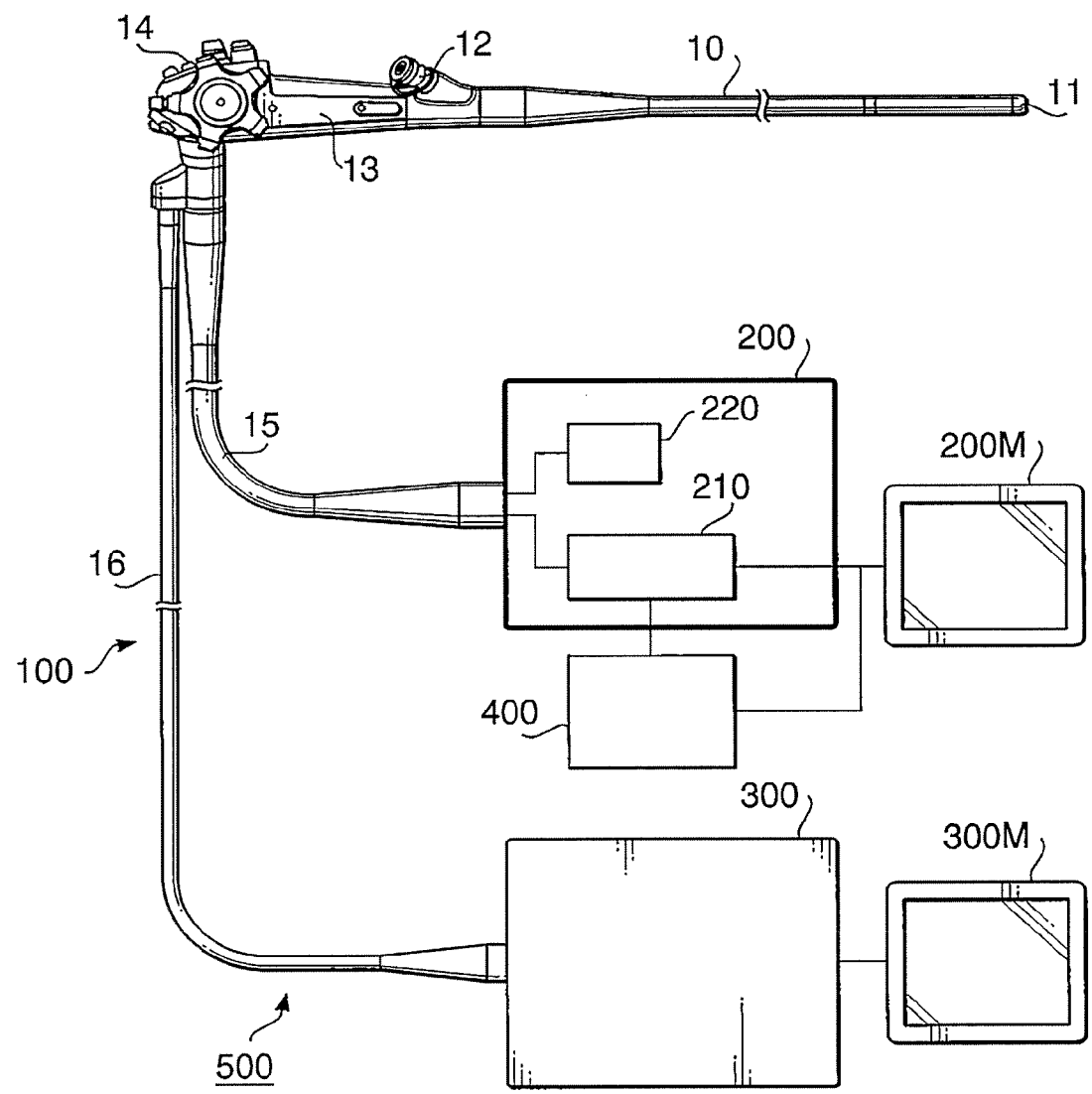
FIG. 1 is a block diagram of a confocal scanning endoscope system according an embodiment of the invention.

FIG. 1 is a block diagram of a confocal scanning endoscope system (hereafter, simply referred to as a confocal endoscope system) 500 according an embodiment of the invention. The confocal endoscope system 500 includes an electronic endoscope 100 having a flexible insertion tube 10 to be inserted into a body cavity to obtain an image of tissue in the body cavity, a processor 200 to which the electronic endoscope 100 is connected, a processor 300, a display area adjustment device 400 connected to the processor 200, and monitors 200M and 300M respectively connected to the processors 200 and 300. On the monitors 200M and 300M, images output by the processors 200 and 300 are displayed, respectively.

The electronic endoscope 100 has a confocal observation function of obtaining information concerning an image of tissue in a body cavity through use of a confocal optical system as well as a function of imaging tissue in a body cavity through use of an image pick-up device, such as a CCD. As shown in FIG. 1, the electronic endoscope 100 includes the flexible insertion tube 10 having flexibility, a tip portion 11 of the flexible insertion tube 10, an insertion hole 12 into which various types of treatment instruments, such as forceps, can be inserted, a holding part 13 to be held by an operator for operation of the electronic endoscope 100, an operation unit 14 having various type of buttons and levers to be operated by the operator, a cable 15 to be connected to the processor 200, and a cable 16 to be connected to the processor 300.

The processor 200 is used for the confocal observation. The processor 200 includes an image forming and processing unit 210 configured to form and process images to be output to the monitor 200M, and a light source unit 220. The processor 300 is used for normal observation. The processor 300 includes an image processing unit (not shown) configured to from and process images to be output to the monitor 300M.

Figure 2:
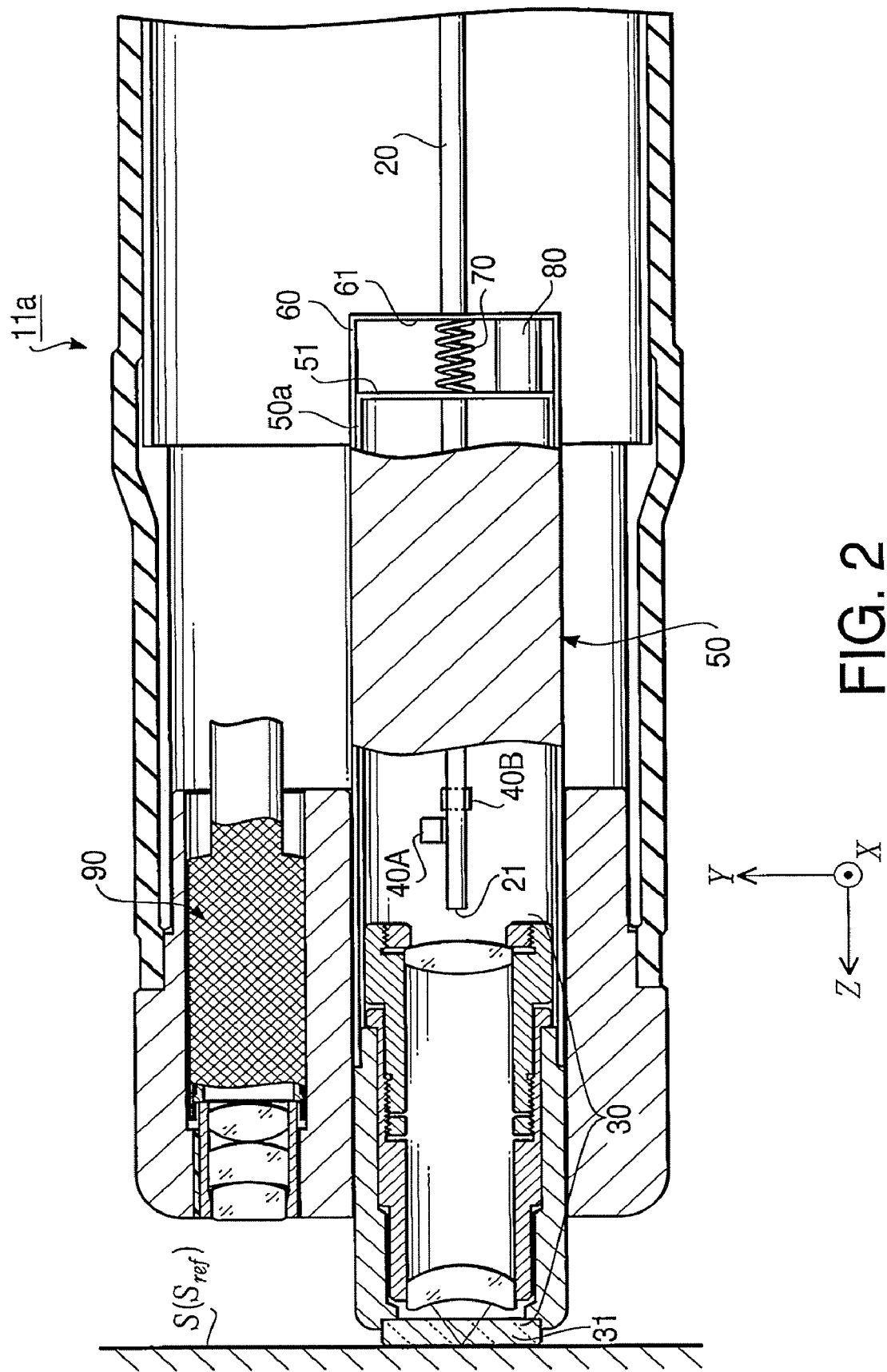
FIG. 2 is a cross section of a tip portion of a flexible insertion tube of the confocal scanning endoscope system illustrating an internal structure of the tip portion.

FIG. 2 is a cross section of the tip portion 11 of the flexible insertion tube 10 illustrating an internal structure of the tip portion 11. As shown in FIG. 2, in the tip portion 11, a confocal observation unit 50 and a normal observation unit 90 are provided. The confocal observation unit 50 includes a single mode optical fiber (hereafter, simply referred to as an optical fiber) 20, an objective optical system 30, a cover glass 31, and piezoelectric elements 40A and 40B. These components of the confocal observation unit 50 are held in a cylindrical frame 50a. The cylindrical frame 50a is held in a cylindrical metallic pipe 60 having a diameter slightly larger than that of the cylindrical frame 50a so as to be slidable in the cylindrical metallic pipe 60.

In FIG. 2, an axis equal to an optical axis of the objective optical system 30 is defined as a Z-axis. Axes which are orthogonal to each other and are orthogonal to the Z-axis are defined as X and Y axes. The X and Y axes define an X-Y plane with which the z-axis perpendicularly intersects. The optical fiber 20 is provided between the light source unit 220 and the objective optical system 30, and serves to guide light between the objective optical system 30 and the processor 200. The piezoelectric elements 40A and 40B are located in the vicinity of a facet 21 of the optical fiber 20. The piezoelectric elements 40A and 40B are positioned such that displacement directions thereof are orthogonal to each other (i.e., X and Y directions). When applied a voltage, each of the piezoelectric elements 40A and 40B presses and moves a tip portion near the facet 21 of the optical fiber 20 in the X or Y direction. According to movement of the tip portion of the optical fiber 21 in a direction perpendicular to the optical axis of the objective optical system 30 caused by the piezoelectric elements 40A and 40B, a light beam emerging from the facet 21 of the optical fiber 21 scans on a surface of the tissue S in two dimensions.

Between an outer wall 51 of the cylindrical frame 50a and an inner wall 61 of the cylindrical metallic pipe 60, a coil spring 70 and shape-memory alloy 80 are provided. Each of the outer wall 51 and the inner wall 61 is in parallel with the X-Y plane. The shape-memory alloy 80 deforms when an external force acts thereon at ambient temperatures, and contracts to a memorized shape when heated to a temperature higher than or equal to a predetermined temperature. If temperature increases from a state shown in FIG. 2 (i.e., if the shape-memory alloy 80 is heated), the shape-memory alloy 80 contracts in the Z-direction. In the state shown in FIG. 2, the coil spring 70 is in a state of being compressed with respect to its natural length. Therefore, in the state shown in FIG. 2, the coil spring 70 presses the cylindrical frame 50 toward the front side (i.e. toward the tip portion of the flexible insertion tube 50).

When heated by an applied voltage, the shape-memory alloy 80 contracts. The strength of the contractile force of the shape-memory alloy 80 is larger than the pressing force of the coil spring 70. Therefore, when the shape-memory 80 is heated, the cylindrical frame 50 slides toward the rear side (i.e., an opposite side with respect to the cover glass 31). In this case, a light convergence point at which the light passed through the objective optical system 30 converges shifts in the Z-direction. Consequently, scanning of the light in the Z-direction can be achieved.

Hereafter, an image forming process performed through the confocal observation unit 50 is explained. The optical fiber 20 has the function of guiding light from the light source unit 220 and emitting light from the facet 21. In this case, the facet 21 of the optical fiber 20 serves as a secondary point source. In the following, a region on a plane which is parallel with the X-Y plane and in which the facet 21 is moved by the effect of the piezoelectric elements 40A and 40B is referred to as "a sweeping plane".

The light emitted form the facet 21 passes through the objective optical system 30 and the cover glass 31 contacting the tissue S, and is converged on the tissue S. The light reflected from the tissue S passes through the cover glass 31 and the objective optical system 30 and then returns to the facet 21. To receive light from the tissue S, the objective optical system 30 and the optical fiber 20 are located such that the facet 21 is positioned at the front focal point of the objective optical system 30. In other words, the objective optical system 30 and the optical fiber 20 are located such that, to the facet 21 situated at a certain point in the sweeping plane, only light reflecting from the tissue S at a converging point which is conjugate with the facet 21 enters. Therefore, the facet 21 has a light extraction function of extracting only light which converged on the tissue S.

The returning light entering the facet 21 is guided to the processor 200 through the optical fiber 20. Part of the returning light is guided to the image forming and processing unit 210, for example, by a fiber coupler. The image forming and processing unit 210 forms a point image from the returning light, locates the point image at a position corresponding to the scanned position on the tissue, and continues such operations so that an image (a still image) corresponding to one frame can be formed. Further, the image forming and processing unit 210 executes predetermined image processing on the formed image. Then, the processed image is output to the monitor 200M. The operator conduct diagnosis on the tissue S while observing the highly magnified, high resolution image of the tissue S displayed on the monitor 200M.

The normal observation unit 90 includes an objective optical system through which white light from the processor 300 is emitted toward the tissue S, and an image pick-up device (not shown). In the normal observation, light from the processor 300 illuminates the tissue S. The light reflected from the tissue S is received by the image pick-up device in the normal observation unit 90. The image pick-up device generates an image signal corresponding to an image formed thereon, and transmits the image signal to the processor 300.

The processor executes predetermined image processing on the image signal, and outputs the processed image signal to the monitor 300M. Then, the image of the tissue S is displayed on the monitor 300M.

Adjustment of a display area for the confocal observation will now be described in detail. Conventionally, resolution test of an objective optical system is conducted using a resolution chart on which a plurality of striped patterns are arranged. However, if such an resolution test is conducted to test resolution of the confocal observation unit 50 of the confocal endoscope system 500 in which one frame image is formed as a group of point images obtained by the light scanning on the tissue S, the resolution test needs to be conducted for each of the point images. As described below, in this embodiment, the adjustment of a display area for the confocal observation is conducted without requiring such a conventional resolution test.

If a beam spot formed on the tissue S by the objective optical system 30 of the confocal observation unit 50 is not suitably converged (i.e., the beam spot is diffused), Encircled Energy of the light reflecting from the tissue S decreases depending on the degree of diffusion of the beam spot. The Encircled Energy means the intensity of part of light reflecting from an illuminated sample (i.e., the tissue S) incident on the facet 21. That is, the Encircled Energy means the intensity of light extracted by the facet 21.

In general, an aberration becomes larger at a point farther from an optical axis of an objective optical system (i.e., lateral resolution of an objective optical system decreases as the distance form an optical axis of the objective optical system increases). The lateral resolution means the resolution of the objective optical system 30 defined in the X-Y plane. The resolution in the longitudinal direction (i.e., the Z-axis direction) can also be defined for the confocal observation unit 50 because as described above the confocal observation unit 50 is able to move along the longitudinal direction (the Z-axis direction). However, in the following, attention is focused on the lateral resolution.

Figure 3:
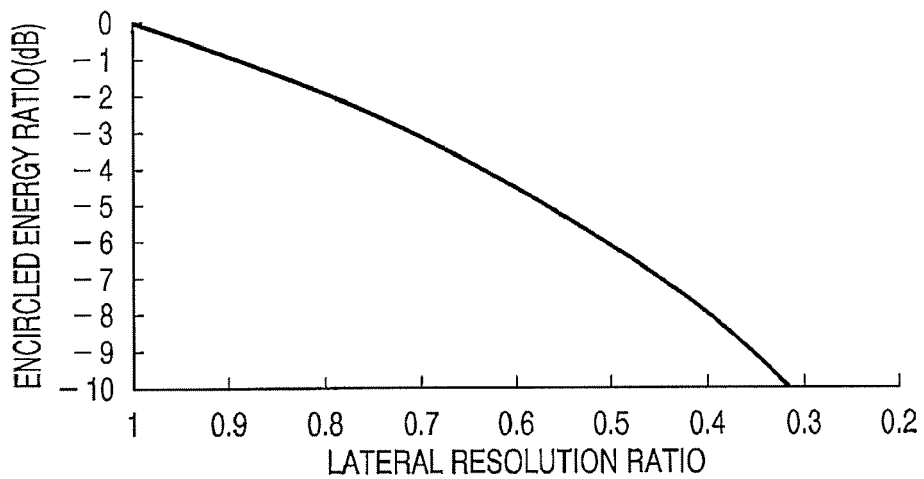
FIG. 3 is a graph illustrating a relationship between Encircled Energy and lateral resolution of an objective optical system of the confocal scanning endoscope system.

On the tissue S, light passed through a peripheral region of the objective optical system 30 forms a beam spot which is diffused more largely than a beam spot formed by paraxial light of the objective optical system 30. Therefore, the Encircled Energy of the light passed through the peripheral region of the objective optical system 30 becomes smaller in comparison with the paraxial light. FIG. 3 is a graph illustrating a relationship between the Encircled Energy and the lateral resolution of the objective optical system 30. In FIG. 3, a horizontal axis represents a lateral resolution ratio, and the vertical axis represents a Encircled Energy ratio. The lateral resolution ratio means a value of the lateral resolution defined with respect to a reference resolution having a value of 1 (i.e., the maximum lateral resolution defined at the center of the objective optical system 30). The Encircled Energy ratio means a value of the Encircled Energy defined with respect to the maximum Encircled Energy of light obtained on the facet 21. As shown in FIG. 3, the Encircled Energy and the lateral resolution of the objective optical system 30 have a relationship.

More specifically, because the lateral resolution can be divided into two components defined in two directions orthogonal to each other, and the Encircled Energy is figured out as intensity of light per unit area, the square of the lateral resolution is proportional to the Encircled Energy.

Based on the above mentioned consideration, the display area for the confocal observation is adjusted by measuring the Encircled Energy in the sweeping area and determining an area in the sweeping area having the Encircled Energy larger than a certain level. An image formed within the display area is a bright high resolution image.

Figure 4:
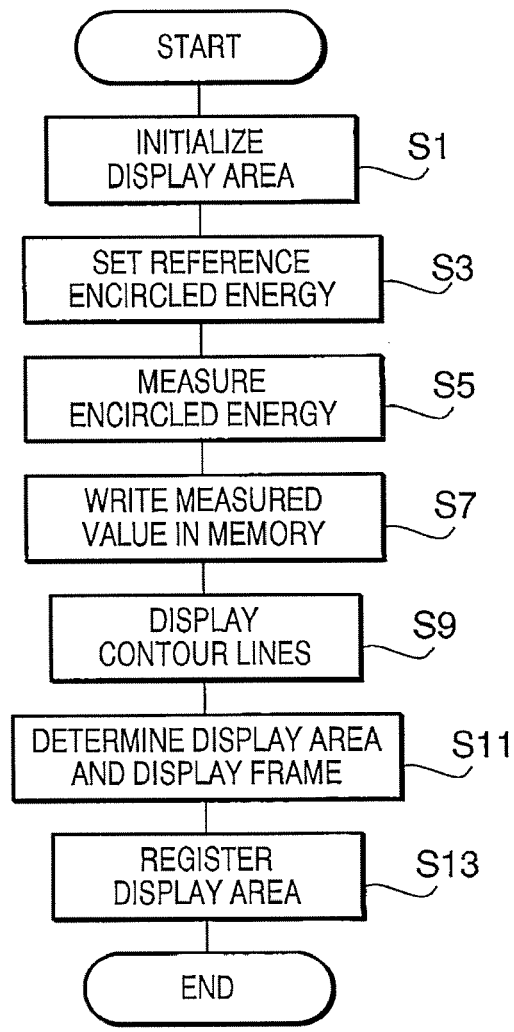
FIG. 4 is a flowchart illustrating a display area adjustment process performed under control of a display area adjustment device in the confocal scanning endoscope system.

FIG. 4 is a flowchart illustrating a display area adjustment process performed under control of the display area adjustment device 400 in the confocal endoscope system 500. The display area adjustment process may be initiated when the display area adjustment device 400 is attached to the processor 200 or when an instruction for initiation of the display area adjustment is inputted to the processor 200 to which the display area adjustment device 400 is connected.

As shown in FIG. 4, first, current settings concerning the display area adjustment are initialized (step S1). The step S1 may be omitted if the initialization of settings concerning the display area adjustment is conducted before shipment. Next, in step S3, a reference Encircled Energy is set to the display area adjustment device 400. The reference Encircled Energy may be inputted to the display area adjustment device 400 from an external device each time the display area adjustment process is conducted or may be stored in advance in the display area adjustment device 400. For example, the Encircled Energy ratio of −5 dB (corresponding to the lateral resolution of approximately 0.56) is defined as the reference Encircled Energy. The light amount corresponding to the Encircled Energy ratio of −5 dB is approximately one-third of the light amount corresponding to the maximum Encircled Energy ratio.

Next, in step S5, the Encircled Energy is measured. The Encircled Energy measurement is conducted by illuminating a reference sample Sref and imaging the reference sample Sref through the confocal observation unit 50. The reference sample Sref is a homogeneous material. For example, water-soluble paint or an aqueous solution in which fluorescent material is solved may be used as the reference sample Sref.

In this embodiment, the Encircled Energy is measured as the intensity of light extracted by the facet 21 and received by the image forming and processing unit 210 through the optical fiber 20 because loss of light occurring by passing through the optical fiber 20 before reaching the image forming and processing unit 210 is almost zero and therefore the Encircled Energy on the facet 21 can be regarded as the intensity of light received by the image forming and processing unit 210. A measurement result is then stored in a memory in the display area adjustment device 400 (step S7).

Figure 5:
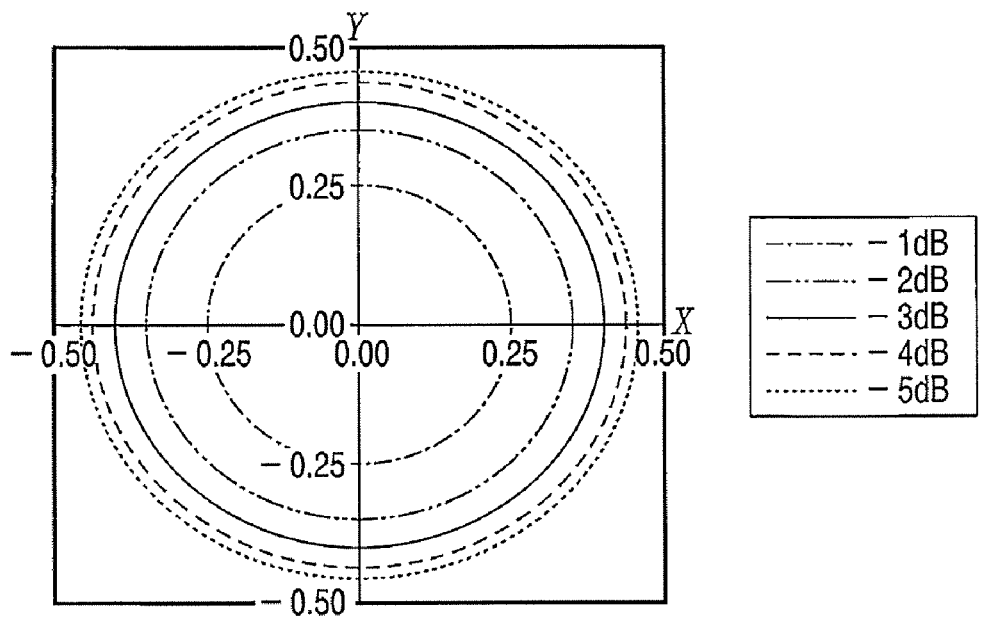
FIG. 5 illustrates an example of a graph of contour lines representing the distribution of the Encircled Energy.

After the facet 21 has moved in the entire sweeping plane (i.e., the scanning for generating one frame image of the reference sample Sref is finished), the display area adjustment device 400 executes a predetermined calculation on the results of measurements of the Encircled Energy stored therein to obtain distribution of Encircled Energy on the sweeping plane. The display area adjustment device 400 displays an image representing the distribution of the Encircled Energy by contour lines on the monitor 200M. FIG. 5 illustrates an example of a graph of the contour lines representing the distribution of the Encircled Energy. In FIG. 5 (and in the following similar drawings), X and Y axes correspond to the X-axis direction and the Y-axis direction in FIG. 2. Scales on the X and Y axes represent the distance (shift amount) from the origin.

In FIG. 5, positional errors of the components (e.g., the objective optical system 30) in the confocal observation unit 50 are neglected. Therefore, the intensity of the Encircled Energy is symmetrical about the origin (i.e., the initial position (initial state) at which the facet 21 is situate when no piezoelectric force of the piezoelectric elements 40A and 40B is applied to the facet 21). As can be seen from FIG. 5, the Encircled Energy decreases as the distance from the origin increases. When the facet 21 is in the initial state and the components in the confocal observation unit 50 have no positional errors, the central axis of the facet 21 (i.e., an optical axis of the optical fiber 20) coincides with the optical axis of the objective optical system 30.

Figure 6:
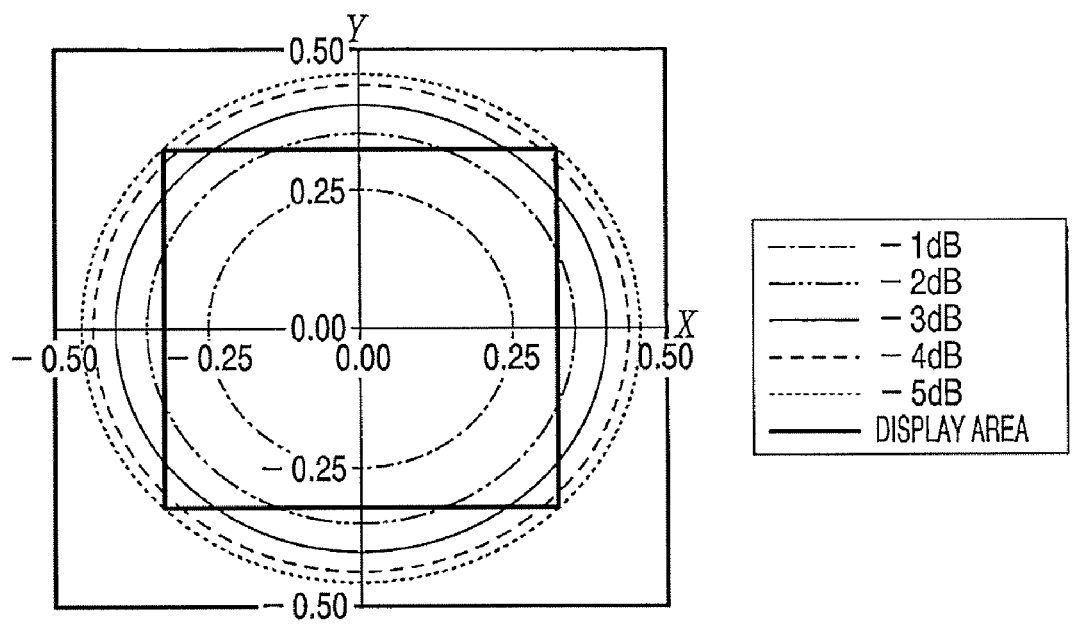
FIG. 6 illustrates the distribution of the Encircled Energy on which a recangular frame representing the display area is overlayed.

After the contour lines shown in FIG. 5 are displayed, the display area adjustment device 400 determines an area (i.e., the display area) satisfying a condition where in the area the Encircled Energy is larger or equal to the reference Encircled Energy, and displays a frame suitably shaped to represent the display area (step S11). In general, an image displayed on the monitor 200M has a rectangular shape. Therefore, the frame of the display area may be formed in a rectangular shape as shown in FIG. 6. In FIG. 6, the rectangular frame indicated by a heavy line represents the display area.

After the step S11 is processed, information concerning the display area satisfying the condition where in the display area the Encircled Energy is larger than or equal to the reference Encircled Energy is registered in the processor 200 (step S13).

Figure 7:
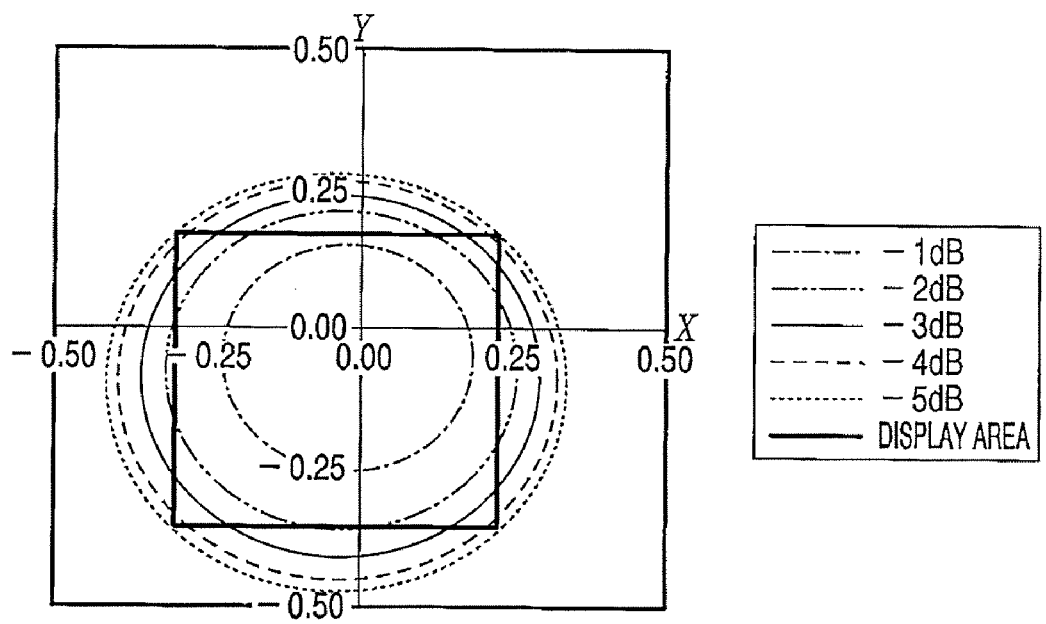
FIG. 7 illustrates the distribution of the Encircled Energy and the rectangular frame representing the display area when components in a confocal observation unit in the confocal scanning endoscope system have positional errors.

FIG. 7 illustrates an example of a graph of the contour lines representing the distribution of the Encircled Energy and the frame representing the display area when the components in the confocal observation unit 50 have the positional errors. In FIG. 7, the distribution of the Encircled Energy is not symmetrical about the origin due to the positional errors, such as decentering. However, the frame appropriately represents the display area in which the Encircled Energy is larger than or equal to the reference Encircled Energy.

After the above mentioned display adjustment process in which the information concerning the display area is registered in the processor 200 is executed, the confocal endoscope system 500 forms an image corresponding to the display area. More specifically, in the image forming and processing unit 210 which obtains one frame image using the light transmitted from the confocal observation unit 50 via the optical fiber 20, a peripheral region of the one frame image is cut out or masked so that a part of the obtained one frame image corresponding to the display area is displayed on the monitor 200M in accordance with the information concerning the display area. Alternatively or additionally, a movement range of the facet 21 may be limited to a range corresponding to the display area by driving the piezoelectric elements 40A and 40B in accordance with the information concerning the display area so that an image corresponding to the display area can be formed using the light from the confocal observation unit 50 in the image forming and processing unit 210.

As described above, once the display area adjustment process is executed and the information concerning the display area is registered, the confocal endoscope system 500 becomes able to display a high resolution image suitable for the confocal observation. Therefore, once the information concerning the display area is registered in the processor 200, the display area adjustment device 400 is not required. Therefore, the display area adjustment device 400 may be configured to detachably attached to the processor 200 or the monitor 200M. In this case, the confocal endoscope system 500 may be configured not to have the display area adjustment device 400 as a standard component. Consequently, cost reduction and downsizing of the confocal endoscope system 50 can be achieved. In this case, the display adjustment device 400 may be connected to the confocal endoscope system 500 only when the initial setting before shipment is conducted. Alternatively, the display area adjustment device may be given only to a maintenance person so that the display area adjustment can be executed in periodical maintenance services by the maintenance person.

Although the present invention has been described in considerable detail with reference to certain preferred embodiments thereof, other embodiments are possible.

Although in the above mentioned embodiment the frame representing the display area has a rectangular shape, the frame may be formed to have a shape different from the rectangular shape. A shape resembling a rectangle may be used as the shape of the frame representing the display area. For example, an octagonal shape formed by cutting out the corners of the rectangular shape may be used as the shape of the frame representing the display area.

In the above mentioned embodiment, the Encircled Energy ratio of −5 dB (i.e., the lateral resolution ratio of 0.56) is used as the reference Encircled Energy. The Encircled Energy ratio of −5 dB corresponds to a minimum level required to display an image having sufficiently high resolution and brightness for endoscopic observations on the monitor 200M. For example, for displaying an image having higher resolution and brightness, the Encircled Energy ratio of −3 dB (corresponding to the lateral resolution of approximately 0.70) may be used as the reference Encircled Energy.

Figure 8:
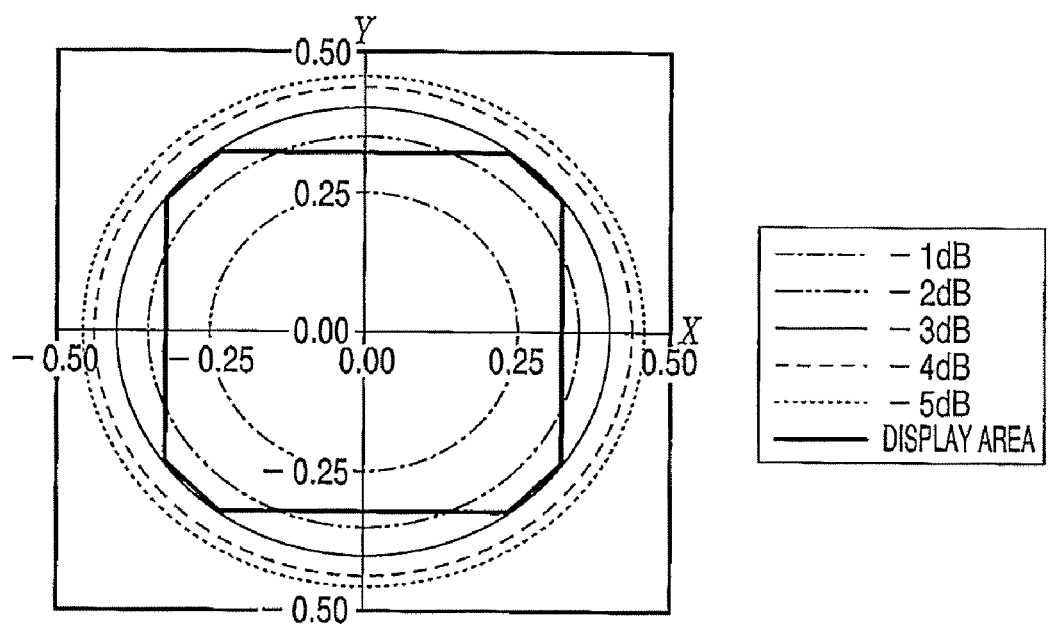
FIG. 8 illustrates the distribution of the Encircled Energy in which an octagonal frame representing the display area is overlayed.
Figure 9:
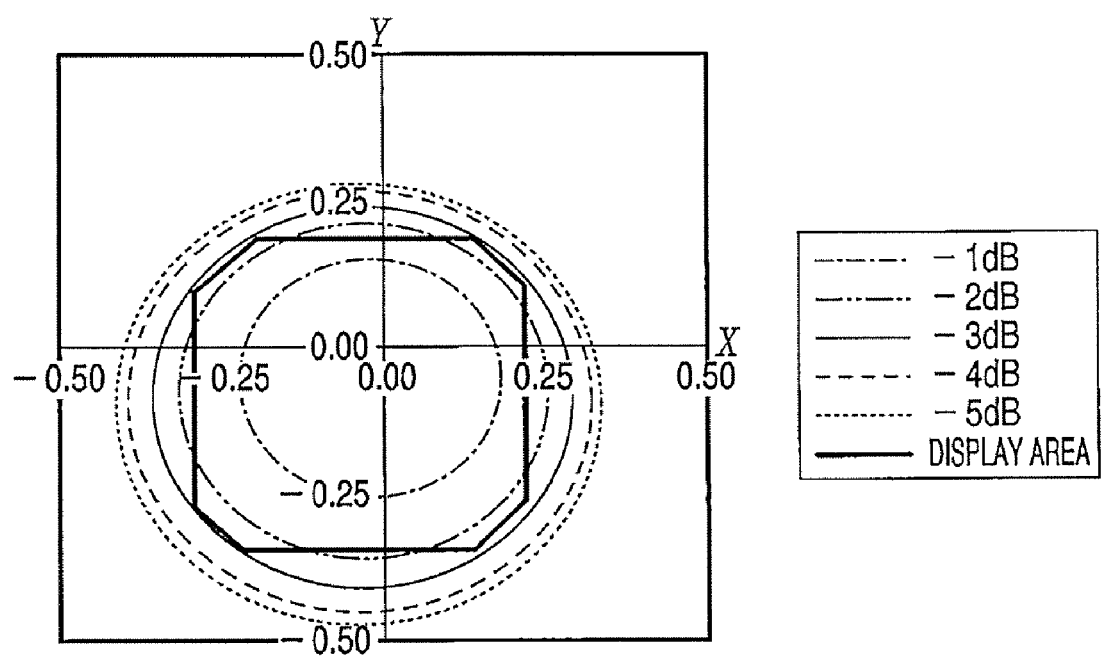
FIG. 9 illustrates the distribution of the Encircled Energy and the octagonal frame representing the display area when components in the confocal observation unit in the confocal scanning endoscope system have positional errors.

FIGS. 8 and 9 illustrate examples of graphs of contour lines representing the distribution of the Encircled Energy and frames representing the display area calculated through the steps S11 of the display area adjustment process. In each of the graphs shown in FIGS. 8 and 9, the frame is formed in an octagonal shape. As can be seen from the comparison between the graphs shown in FIGS. 6 to 9, when the relatively high reference Encircled Energy is employed, the image in the display area has high Encircled Energy (i.e., a high resolution) although in this case the size of the display area reduces.

The confocal endoscope system 500 described in the above mentioned embodiment has both the functions of the confocal observation and the normal observation. However, the confocal endoscope system 500 may be configured to only have the confocal observation function. In this case, the normal observation unit 90 and the processor 300 can be omitted.

This application claims priority of Japanese Patent Application No. P2005-231433, filed on Aug. 10, 2005. The entire subject matter of the application is incorporated herein by reference.

What is claimed is:

1. A confocal scanning endoscope system, including a flexible insertion tube, the system comprising:
   a light source that emits light;
   a scanning unit disposed in the flexible insertion tube that deflects the light emitted by the light source so that the light scans on a subject in two dimensions with respect to the entire flexible insertion tube;
   an objective optical system that directs the light deflected by the scanning unit to the subject;
   an extraction unit that extracts only part of the light returning from a convergence point at which the light is converged by the objective optical system on an object side;
   an image formation unit configured to form an image based on the part of the light extracted by the extraction unit; and
   a display area adjustment unit configured to measure Encircled Energy of the part of the light extracted by the extraction unit and to adjust a display area of the image based on the measured Encircled Energy.

2. The confocal scanning endoscope system according to claim 1, wherein the display area adjustment unit adjusts the display area such that the Encircled Energy is larger than or equal to a predetermined level in the display area in accordance with a relationship between the Encircled Energy and lateral resolution of the objective optical system.

3. The confocal scanning endoscope system according to claim 1, wherein the display area adjustment unit adjusts the display area such that the Encircled Energy in the display area is larger than or equal to −5 dB with respect to the Encircled Energy defined for the part of the light proceeding along an optical axis of the objective optical system.

4. The confocal scanning endoscope system according to claim 1, wherein the display area adjustment unit adjusts the display area such that the Encircled Energy in the display area is larger than or equal to −3 dB with respect to the Encircled Energy defined for the part of the light proceeding along the optical axis of the objective optical system.

5. The confocal scanning endoscope system according to claim 4, wherein lateral resolution of the objective optical system defined in the display area with respect to lateral resolution of the objective optical system at a center of the image is 0.7.

6. The confocal scanning endoscope system according to claim 1, wherein the Encircled Energy is measured by the display adjustment unit in a condition where the subject illuminated with the light is a sample formed of homogeneous material.

7. The confocal scanning endoscope system according to claim 1, wherein:
the display area adjustment unit generates information concerning the adjusted display area and provides the information for the image formation unit; and
the image formation unit forms the image further based on the information concerning the adjusted display area.

8. The confocal scanning endoscope system according to claim 1, wherein:
the display area adjustment unit generates information concerning the adjusted display area and provides the information for the scanning unit; and
the scanning unit deflects the light based on the information concerning the adjusted display area so that the light is deflected in a range corresponding to the adjusted display area.

9. The confocal scanning endoscope system according to claim 1, further comprising:
a processor comprising the image formation unit; and
a display unit on which the image formed by the image formation unit is displayed,
wherein the light source, the scanning unit, the objective optical system and the extraction unit are accommodated in the flexible insertion tube,
wherein the endoscope and the display unit are connected to the processor,
wherein the display area adjustment unit is detachably attached to the processor.

10. The confocal scanning endoscope system according to claim 9, wherein:
the endoscope includes an optical fiber provided in the flexible insertion tube; and
a facet of the optical fiber at a tip portion of the flexible insertion tube serves as the light source.

11. The confocal scanning endoscope system according to claim 10, wherein the scanning unit deflects the light by moving the facet of the optical fiber in a plane with which an optical axis of the objective optical system perpendicularly intersects.

12. The confocal scanning endoscope system according to claim 10, wherein:
the facet of the optical fiber is located at a position conjugate with the subject with respect to the objective optical system; and
the facet serves as the extraction unit.

13. The confocal scanning endoscope system according to claim 1, wherein the Encircled Energy is proportional to a square of lateral resolution of the objective optical system.

14. A confocal scanning endoscope system, including a flexible insertion tube, the system comprising:
a light source that emits light;
a scanning unit disposed in the flexible insertion tube that deflects the light emitted by the light source so that the light scans on a subject in two dimensions with respect to the entire flexible insertion tube;
an objective optical system that directs the light deflected by the scanning unit to the subject;
an extraction unit that extracts only part of the light returning from a convergence point at which the light is converged by the objective optical system on an object side;
an image formation unit configured to form an image based on the part of the light extracted by the extraction unit,
wherein Encircled Energy of the part of the light extracted by the extraction unit is larger than or equal to a predetermined level in an entire region of the image formed by the image formation unit.

15. The confocal scanning endoscope system according to claim 14, wherein the Encircled Energy in the entire region of the image is larger than or equal to −5 dB with respect to the Encircled Energy defined for the part of the light proceeding along an optical axis of the objective optical system.

16. The confocal scanning endoscope system according to claim 14, further comprising a display unit on which the image formed by the image formation unit is displayed.

17. An adjustment method for an image formed by a confocal scanning endoscope system including a flexible tube, an extraction unit that extracts only part of light returning from a convergence point at which the light is converged by an objective optical system on an object side, and an image formation unit configured to form an image based on the part of the light extracted by the extraction unit, the method comprising:
deflecting, by a scanning unit disposed in the flexible tube, light emitted by a light source so that the light scans on the subject in two dimensions with respect to the entire flexible tube;
measuring Encircled Energy of the part of the light extracted by the extraction unit; and
adjusting a display area of the image based on the measured Encircled Energy.

18. The adjustment method according to claim 17, wherein the measuring of Encircled Energy is conducted in a condition where the subject illuminated with the light is a sample formed of homogeneous material.

19. The adjustment method according to claim 17, wherein the display area of the image is adjusted by masking a part of the image formed by the image formation unit.

20. The adjustment method according to claim 17, wherein the display area of the image is adjusted by causing the scanning unit to adjust a scanning range of the light.

* * * * *